United States Patent
Wenzel

(10) Patent No.: US 9,222,442 B2
(45) Date of Patent: Dec. 29, 2015

(54) MODULE INTEGRATING MIXER AND PARTICULATE SEPARATOR INTO A COMMON HOUSING AND AN ENGINE BREATHING SYSTEM HAVING THE MODULE

(75) Inventor: Wolfgang Wenzel, Stuttgart (DE)

(73) Assignee: BorgWarner Inc., Auburn Hills, MI (US)

( * ) Notice: Subject to any disclaimer, the term of this patent is extended or adjusted under 35 U.S.C. 154(b) by 885 days.

(21) Appl. No.: 13/120,032

(22) PCT Filed: Oct. 7, 2009

(86) PCT No.: PCT/US2009/059778
§ 371 (c)(1),
(2), (4) Date: Mar. 21, 2011

(87) PCT Pub. No.: WO2010/045075
PCT Pub. Date: Apr. 22, 2010

(65) Prior Publication Data
US 2011/0173954 A1 Jul. 21, 2011

Related U.S. Application Data

(60) Provisional application No. 61/105,893, filed on Oct. 16, 2008.

(51) Int. Cl.
*F01N 3/00* (2006.01)
*F02M 25/06* (2006.01)
(Continued)

(52) U.S. Cl.
CPC ......... *F02M 25/0722* (2013.01); *F02M 25/074* (2013.01); *F02M 35/022* (2013.01);
(Continued)

(58) Field of Classification Search
CPC .. F01N 2330/12; F02B 47/08; F02B 29/0406; F02M 25/0707; F02M 25/0709; F02M 25/0722; F02M 25/074; F02M 35/022; F02M 25/0713; F02M 25/0732; Y02T 10/121

USPC ............... 60/274, 278, 297, 311, 324
See application file for complete search history.

(56) References Cited

U.S. PATENT DOCUMENTS 6,406,509 B1 * 6/2002 Duffy ............................. 55/492
6,427,671 B1 8/2002 Holze et al.
(Continued)

FOREIGN PATENT DOCUMENTS

| CN | 1273624 A | 11/2000 |
|---|---|---|
| DE | 202007005986 U1 | 9/2008 |
| WO | 2008033418 A1 | 3/2008 |

OTHER PUBLICATIONS

Supplementary European Search Report dated Mar. 30, 2012; Application SN: 09821030.5-2311; Applicant BorgWarner Inc.; 5 pages.
(Continued)

*Primary Examiner* — Jesse Bogue
*Assistant Examiner* — Diem Tran
(74) *Attorney, Agent, or Firm* — BrooksGroup

(57) ABSTRACT

One exemplary embodiment includes a product including a housing that has a mixer portion and first, second and third openings. The first opening is configured to receive at least a portion of exhaust gases produced by an internal combustion engine, and the second opening is configured to receive intake air. The mixer portion is in communication with the first and second openings to mix the exhaust gases and the intake air into a gas mixture. The third opening is in communication with the mixer portion to flow the gas mixture therethrough. The invention further includes a particulate separator disposed within the housing. The particulate separator is configured to remove particulates from the exhaust gases. The product may be included in a low-pressure EGR path and/or a high-pressure EGR path.

16 Claims, 7 Drawing Sheets

(51) Int. Cl.
  *F01N 5/04*  (2006.01)
  *F01N 3/02*  (2006.01)
  *F02M 25/07*  (2006.01)
  *F02M 35/022*  (2006.01)
  *F02B 29/04*  (2006.01)
  *F02B 47/08*  (2006.01)

(52) U.S. Cl.
  CPC ......... *F01N2330/12* (2013.01); *F02B 29/0406* (2013.01); *F02B 47/08* (2013.01); *F02M 25/0707* (2013.01); *F02M 25/0709* (2013.01); *F02M 25/0713* (2013.01); *F02M 25/0732* (2013.01); *Y02T 10/121* (2013.01)

(56) References Cited

U.S. PATENT DOCUMENTS 8,122,717 B2 * 2/2012 Joergl et al. ............... 60/605.1
2006/0045764 A1 3/2006 Thompson et al.
2007/0256413 A1 11/2007 Marsal et al.
2008/0134678 A1 6/2008 Noelle et al.
2008/0149196 A1 6/2008 Fuchinoue et al.

OTHER PUBLICATIONS

Chinese Notification of the First Office Action and Search Report dated Oct. 31, 2012; Applicant: BorgWarner Inc; Application No. 200980139306.2; 15 pages.

Chinese Office Action dated Jan. 21, 2015 ; Application No. 200980139306.2 ;Applicant: BorgWarner Inc. ; 24 pages.

Korean Office Action dated Jun. 2, 2015; Application No. 10-2011-7010129; Applicant: BorgWarner Inc.; 4 pages.

Chinese Office Action dated May 25, 2015; Application No. 200980139306.2; Applicant: BorgWarner Inc.; 39 pages.

* cited by examiner

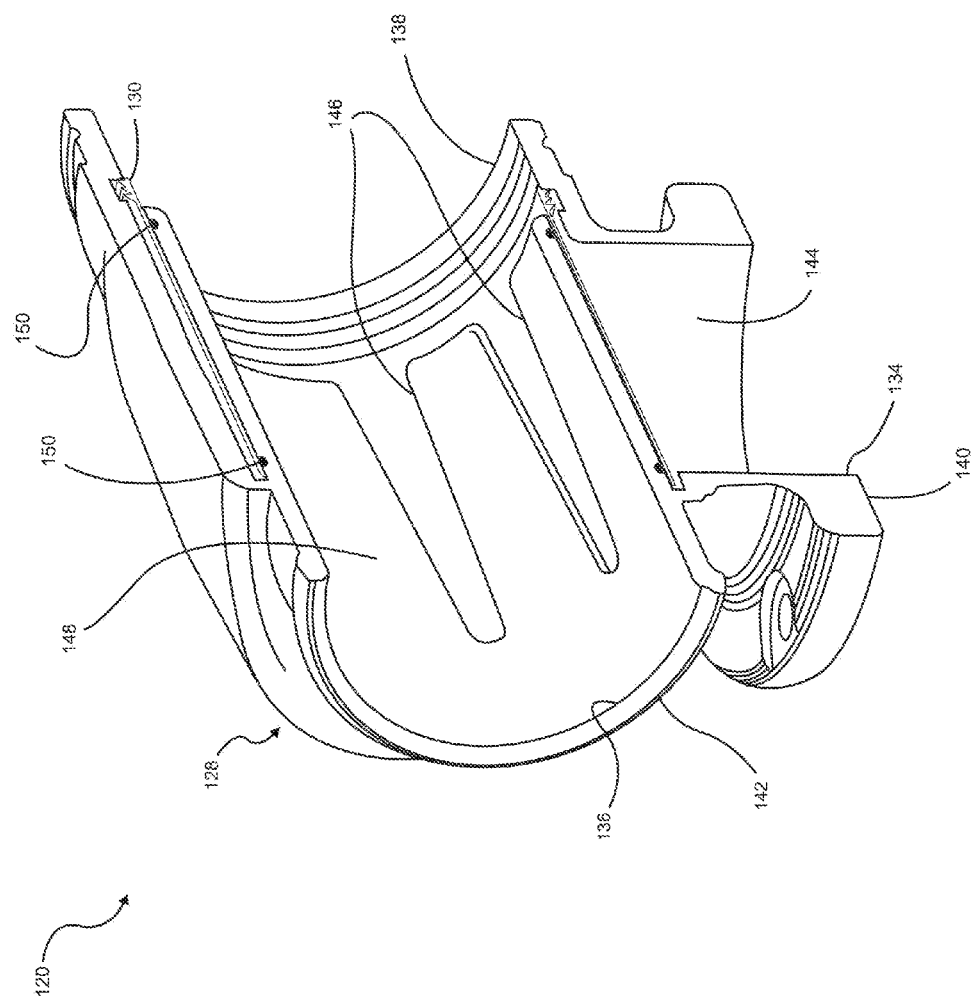

MODULE INTEGRATING MIXER AND PARTICULATE SEPARATOR INTO A COMMON HOUSING AND AN ENGINE BREATHING SYSTEM HAVING THE MODULE

This application claims the benefit of U.S. Provisional Application Ser. No. 61/105,893 filed Oct. 16, 2008.

TECHNICAL FIELD

The disclosure generally relates to engine breathing systems, components of engine breathing systems, and methods of making and using the same.

BACKGROUND

Current and future emissions requirements for diesel and gasoline engines in Europe, US and most foreign markets will require engine concepts capable of achieving low $NO_x$ and low particulate matter emissions while at the same time meeting requirements for low-cost systems and packaging needs.

FIG. 1 is a schematic illustration of a prior art diesel engine breathing system 64 using a single-stage turbo charger. Such a system 64 includes a low pressure exhaust gas recirculation (EGR) loop 66, including a first EGR path 7, a first EGR valve 8, and a first cooler 9.

The system 64 includes a high-pressure loop 68 having a second EGR path 15, second EGR valve 16 and second EGR cooler 17. Exhaust gas is generated by an engine 1 and exits through an exhaust gas manifold 2. The exhaust gas from the exhaust gas manifold 2 can be directed in two directions.

In the first direction, the gas may flow through the high-pressure loop 68 and into the intake manifold 14. To create enough EGR flow through the second EGR path 15 and second EGR cooler 17, the second EGR valve 16 can be adjusted accordingly. If the second EGR valve 16 is fully opened and more flow through the second EGR path 15 and second EGR cooler 17 is required, the intake first throttle valve 13, which is commonly a flapper-type valve, can be closed gradually.

Alternatively, in the second direction, the exhaust may pass through the variable turbine 3 and be introduced into a diesel particulate filter 4, where the gas may be cleaned of various constituents that may include soot, carbon monoxide or hydrocarbons. After flowing through the diesel particulate filter 4 and the exhaust throttle 5 the exhaust gas then exits through the exhaust pipe 6. The first EGR valve 8 can be opened to allow flow through the low-pressure loop 66 to the intake duct 10 and toward the compressor 11 of the turbocharger. Along this second direction, particulates may collect on the diesel particulate filter 4, which may release small particulates that flow through the EGR path 7 to the compressor 11. The particulates may form resin-like deposits of unburned hydrocarbons on the compressor blades. In addition, condensate or droplets from the exhaust gases may flow through the EGR path 7 to the compressor 11.

SUMMARY OF EXEMPLARY EMBODIMENTS OF THE INVENTION

One embodiment of the invention is a product including a housing that has a mixer portion and first, second and third openings. The first opening is configured to receive at least a portion of exhaust gases produced by an internal combustion engine, and the second opening is configured to receive intake air. The mixer portion is in communication with the first and second openings to mix the exhaust gases and the intake air into a gas mixture. The third opening is in communication with the mixer portion to flow the gas mixture therethrough. The invention further includes a particulate separator disposed within the housing. The particulate separator is configured to remove particulates from the exhaust gases. The product may be included in a low-pressure EGR path and/or a high-pressure EGR path.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 7 is another cross-sectional view of the mixer module of FIG. 6.

DETAILED DESCRIPTION OF EXEMPLARY EMBODIMENTS

The following description of the embodiment(s) is merely exemplary in nature and is in no way intended to limit the invention, its application, or uses.

The inventors have recognized a need for a compact device that removes particulates from the recirculated exhaust gases and can be readily packaged within the EGR path.

One embodiment of the invention includes a product integrating multiple engine breathing system components including at least an EGR mixer and a particulate separator into a common housing. The module may be included in a low pressure EGR path and/or a high-pressure EGR path.

Figure 1:
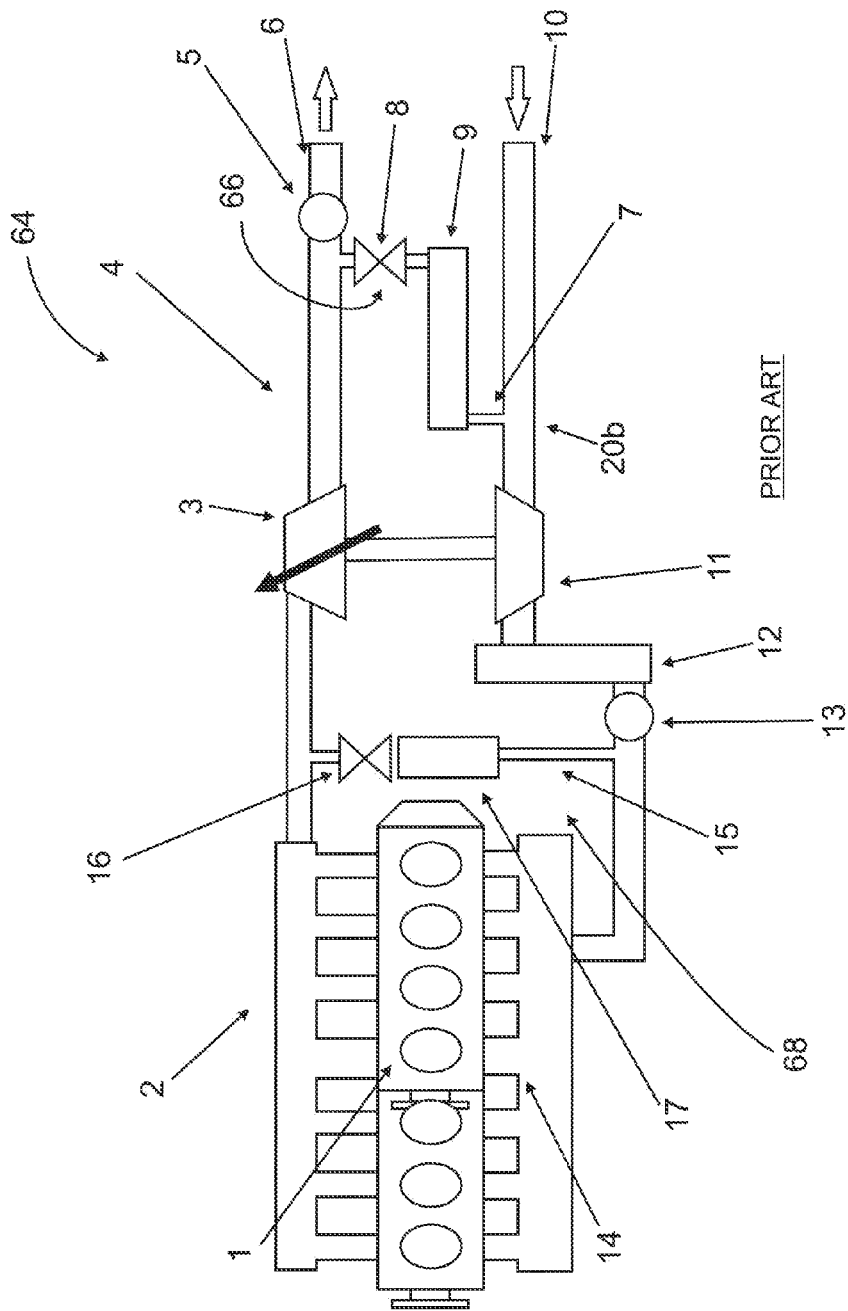
FIG. 1 is a schematic illustration of a prior art engine breathing system.
Figure 2:
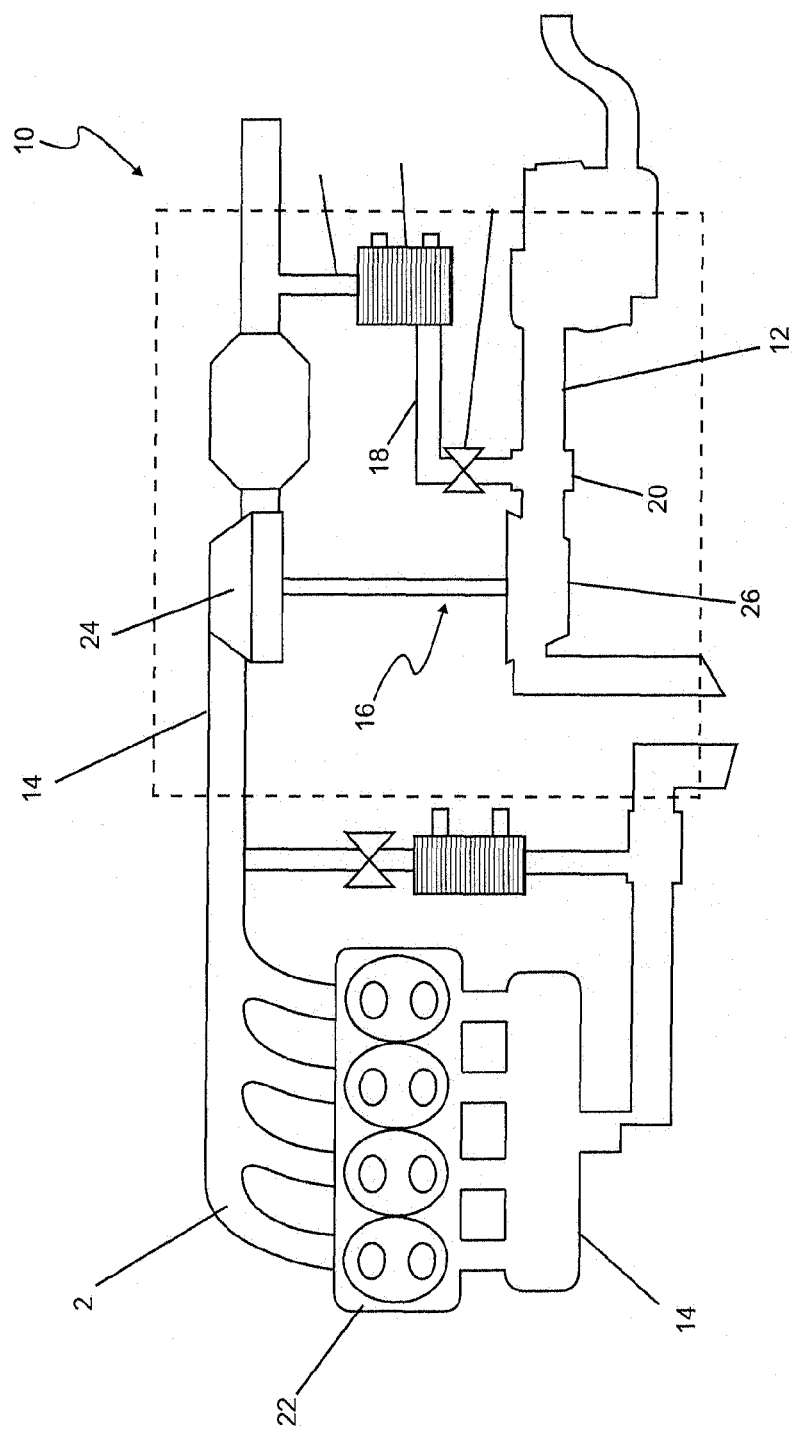
FIG. 2 is a schematic illustration of an engine breathing system according to one embodiment of the invention.

Referring now to FIG. 2, one embodiment of the invention may include an engine breathing system 10 including an intake conduit 12, an exhaust conduit 14, a turbocharger 16, a recirculation conduit 18 and a product or mixer module 20. The intake conduit 12 is configured to route intake air toward an internal combustion engine 22, and the exhaust conduit 14 is configured to receive exhaust gases from the internal combustion engine 22. The turbocharger 16 has a turbine portion 24 associated with the exhaust conduit 14 and a compressor portion 26 associated with the intake conduit 12 so that the compressor portion 26 compresses the intake air in the intake conduit in response to the exhaust gases rotating the turbine portion 24 in the exhaust conduit. The recirculation conduit 18 is a low-pressure exhaust gas recirculation path in communication between the exhaust conduit 14 and the intake conduit 12 for selectively recirculating at least a portion of the exhaust gases back to the internal combustion engine 22. However, the recirculation conduit may instead be a high-pressure exhaust gas recirculation path. As detailed below, the mixer module 20 connects the recirculation conduit 18 to the intake conduit 12 for evenly mixing exhaust gases with the intake air and removing particulates from the exhaust gases.

Figure 3:
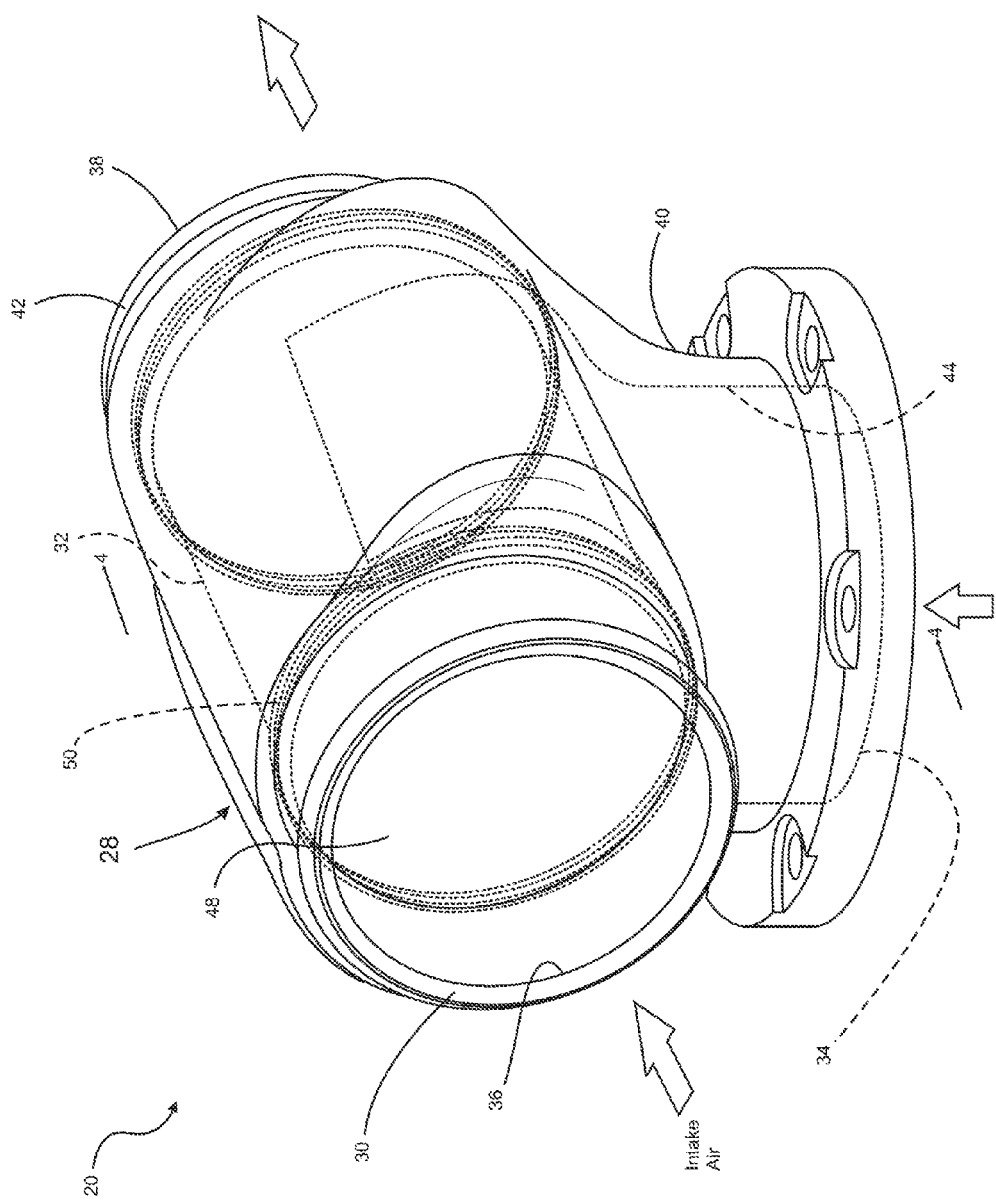
FIG. 3 is a perspective view of a mixer module including a mixer portion and a particulate separator according to one embodiment of the invention.
Figure 4:
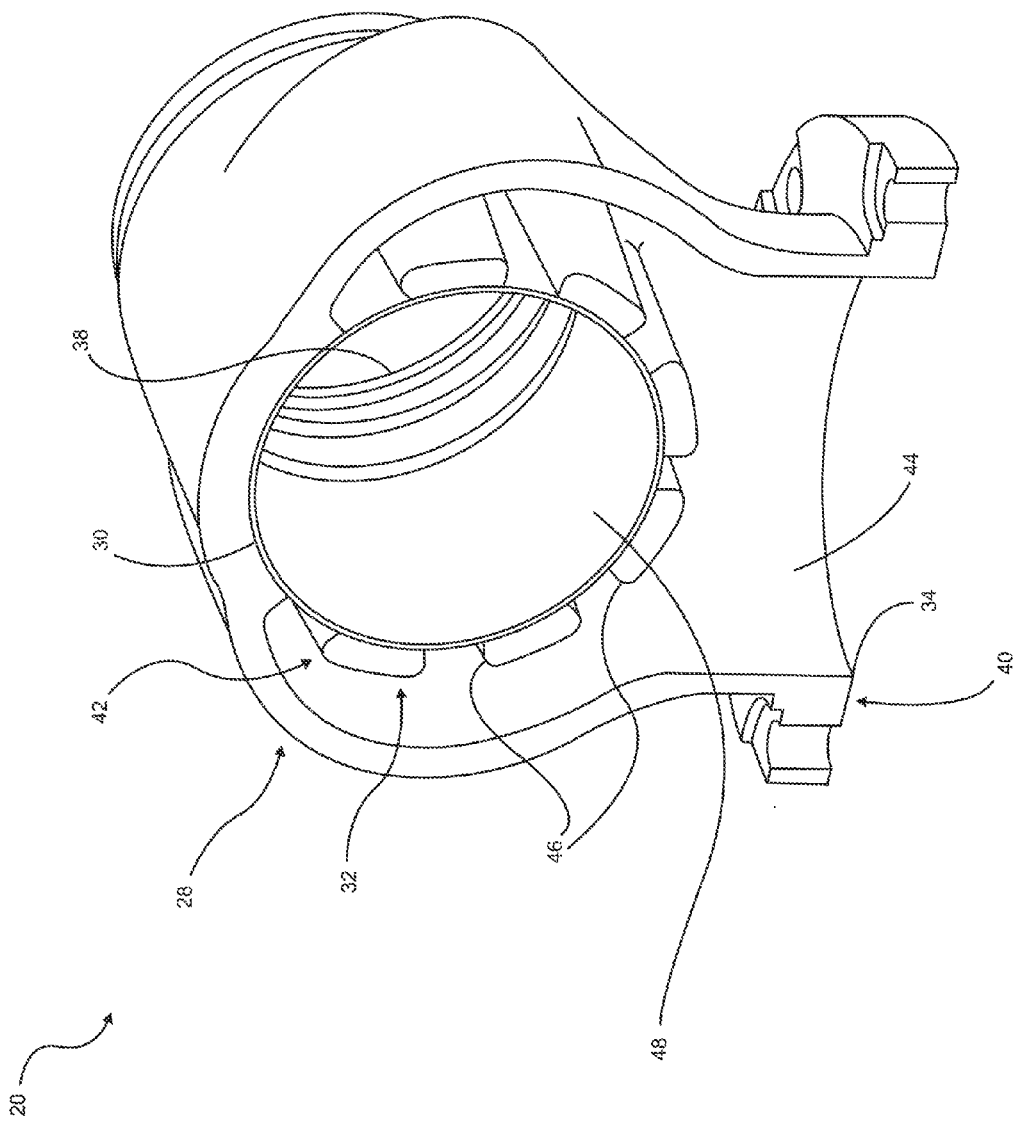
FIG. 4 is a cross-sectional view of the mixer module of FIG. 3 as taken along line 4-4.
Figure 5:
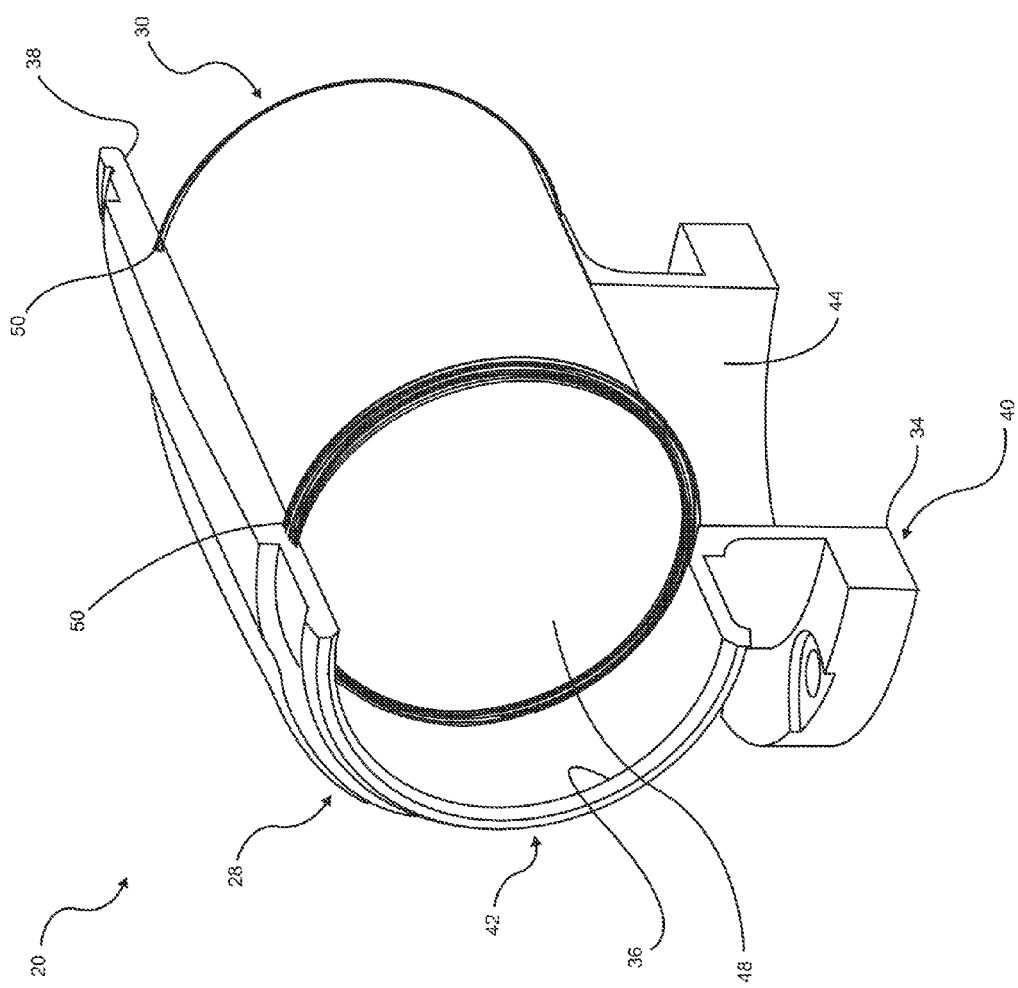
FIG. 5 is a partially cutaway view of the mixer module of FIG. 3.

Referring to FIGS. 3-5, the product or mixer module 20 has a housing 28 and a particulate separator 30. The housing 28 has a mixer portion 32 and first, second and third openings 34, 36, 38. The first opening 34 is configured to receive the exhaust gases from the recirculation conduit 18, and the second opening 36 is configured to receive the intake air from one portion of the intake conduit 12. The mixer portion 32 is in communication with the first and second openings 34, 36 to mix the exhaust gases and the intake air into a gas mixture. The third opening 38 is in communication with the mixer portion 32 to flow the gas mixture therethrough into another portion of the intake conduit 12.

As best shown in FIG. 4, the housing 28 further includes first and second conduits 40, 42 with the mixer portion 32 being an integral part of the second conduit 42. The first conduit 40 has an exhaust gas passage 44 in communication with the first opening 34 to receive the exhaust gases. The first conduit 40 substantially surrounds the mixer portion 32, and the mixer portion 32 has a plurality of spaced apart openings 46 in communication with the exhaust gas passage 44 to receive the exhaust gases therefrom. The second conduit 42 has a mixing passage 48 that is in communication with the spaced apart openings 46 to receive the exhaust gases. The mixing passage 48 further includes one end portion in communication with the second opening 36 to receive the intake air and another end portion in communication with the third opening 38 to flow the gas mixture therethrough.

The housing 28 may be made of a one-piece casting or fabrication. Nevertheless, the housing 28 may instead be made of two or more separate components as desired.

The particulate separator 30 is disposed within the housing and configured to remove particulates from the exhaust gases. The particulate separator 30 (as best shown in FIGS. 4-5) may be a screen member or a filter mesh configured to collect particulates, debris and/or condensate from the exhaust gases. The particulate separator 30 may be various other suitable porous media as desired. The particular separator 30 may have a cylindrical shape and may have a through hole. The particulate separator 30 is coupled to the housing 28 by a friction fit, an insert molding, various suitable fasteners or any combination thereof. For instance, as exemplified in the embodiment shown in FIG. 5, the particulate separator 30 can have an end portion overmolded with elastic annular ridges 50 for snap-fitting within an annular channel of the housing 28. Each ridge 50 is also a seal engaged to the particulate separator 30 so that the exhaust gases are directed through the particulate separator 30. The mixer portion 32 surrounds the particulate separator 30 such that the particulate separator 30 is disposed within the mixing passage 48 of the second conduit 42.

A method of operating the mixer module of FIGS. 2-5 will now be explained according to another embodiment of the invention.

At step 200, the first opening 34 of the housing 28 routes at least a portion of exhaust gases produced by the engine into the exhaust gas passage 44 of the first conduit 40.

Next at step 202, the second opening 36 of the housing 28 routes intake air into the mixing passage 48 of the second conduit 42.

Next at step 204, the particulate separator 30 collects particulates from the exhaust gases within the housing 28. This step may be accomplished by collecting particulates from the exhaust gases on a screen member or filter mesh within a low velocity profile of the exhaust gases in the exhaust gas passage 44. Accordingly, the particulate separator 30 reduces the pressure drop of the exhaust gases. Nevertheless, this step may also be accomplished by the particulate separator 30 collecting particulates from the exhaust gases within the mixing passage 48 of the second conduit 42.

Next at step 206, the particulate separator 30 collects condensate thereon and then vaporizes the condensate.

Next at step 208, the mixer portion 32 routes the intake air and the exhaust gases to mix the intake air and the exhaust gases into the gas mixture. This step may be accomplished by routing the exhaust gases radially inward from the exhaust gas passage 44 through the spaced apart openings 46 of the mixer portion 32 and into the mixing passage 48.

Next at step 210, the product or mixing passage 48 routes the gas mixture through the third opening 38 toward the compressor portion 26 of the turbocharger 16.

Figure 6:
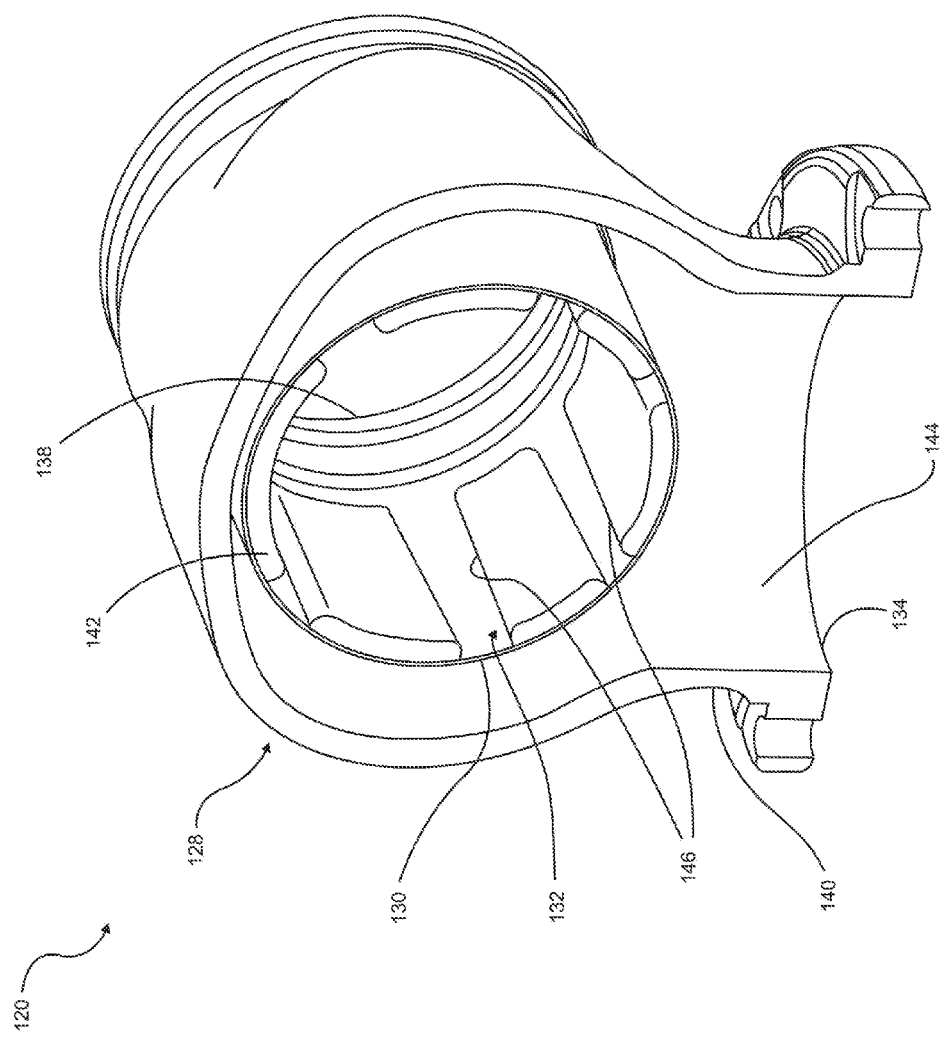
FIG. 6 is a cross-sectional view of a mixer module according to another embodiment of the invention.

Referring to FIGS. 6 and 7, a mixer module 120 is shown according to another embodiment of the invention. The mixer module 120 has a mixer portion 132 and a particulate separator 130 and is substantially similar to the mixer module 20 of FIGS. 3-5 having the mixer portion 32 and particulate separator 30, respectively. However, in this embodiment, the particulate separator 130 surrounds the mixer portion 132 instead of the mixer portion surrounding the particulate separator. Accordingly, the particulate separator 130 is disposed in the exhaust gas passage 144 so that the particulate separator 130 removes the particulates and condensate from a low-velocity flow portion of the exhaust gases and reduces a pressure drop of the exhaust gases. The particulate separator 130 is coupled to the housing 128 by a friction fit, an insert molding, various suitable fasteners or any combination thereof.

The above description of embodiments of the invention is merely exemplary in nature and, thus, variations thereof are not to be regarded as a departure from the spirit and scope of the invention.

What is claimed is:

1. A method of operating a product having a housing including an integrated mixer portion and further including first and second conduits, the first conduit having a first opening and an exhaust gas passage that is in communication with the first opening, the first conduit substantially surrounding a portion of the second conduit, the second conduit having a plurality of spaced apart openings in communication with the exhaust gas passage, the second conduit further including a second opening and a mixing passage that is in communication with both the second opening and the spaced apart openings, the second conduit further including a third opening in communication with the mixing passage, a particulate separator disposed within the mixing passage of the second conduit, the method comprising:

routing exhaust gases through the first opening of the housing;

routing intake air through the second opening of the housing;

collecting particulates from the exhaust gases on the particulate separator within the housing;

routing the intake air and the exhaust gases through the mixer portion to mix the intake air and the exhaust gases into a gas mixture; and routing the gas mixture through the third opening.

2. The method as recited in claim 1, wherein the routing of the exhaust gases through the mixer portion is through the spaced apart openings formed in the second conduit.

3. The method as recited in claim 1, wherein the collecting of the particulates on the particulate separator is on a screen member or a filter mesh.

4. The method as recited in claim 1, further comprising collecting condensate on the particulate separator and then vaporizing the condensate.

5. The method as recited in claim 1, further comprising:
routing the exhaust gases through the first opening and into the exhaust gas passage of the first conduit;
routing intake air through the second opening and into the mixing passage of the second conduit;
routing the exhaust gases from the exhaust gas passage through the spaced apart openings and into the mixing passage to mix the exhaust gases with the intake air; and
routing the gas mixture from the mixing passage through the third opening.

6. The method as recited in claim 5, wherein the routing of the exhaust gases through the spaced apart openings is from the exhaust gas passage toward the mixing passage in at least one of a radially inward direction and a helical direction with respect to the mixing passage.

7. The method as recited in claim 5, wherein the routing of the exhaust gases through the particulate separator is within the mixing passage of the second conduit.

8. The method as recited in claim 5, further comprising collecting condensate on the particulate separator and then vaporizing the condensate.

9. A product comprising:
a housing having an integrated mixer portion and first, second and third openings, the first opening being configured to receive at least a portion of exhaust gases produced by an internal combustion engine, the second opening being configured to receive intake air, the mixer portion in communication with the first and second openings to mix the exhaust gases and the intake air into a gas mixture, and the third opening in communication with the mixer portion to flow the gas mixture therethrough;
a particulate separator disposed within the housing, the particulate separator being configured to remove particulates and condensate from the exhaust gases;
a first and a second conduit, with the mixer portion being an integral part of the second conduit, the first conduit having an exhaust gas passage in communication with the first opening to receive the exhaust gases, the first conduit substantially surrounding the mixer portion, the mixer portion having a plurality of spaced apart openings in communication with the exhaust gas passage to receive the exhaust gases, the second conduit having a mixing passage that is in communication with the spaced apart openings to receive the exhaust gases, the mixing passage further having one end portion in communication with the second opening to receive the intake air and another end portion in communication with the third opening to flow the gas mixture therethrough; and
wherein the particulate separator is located within the mixing passage of the second conduit.

10. The product as recited in claim 9, wherein the housing is made of a one-piece casting.

11. The product as recited in claim 9, wherein the particulate separator is a screen member or a filter mesh configured to collect particulates or debris from the exhaust gases.

12. The product as recited in claim 9, wherein the mixer portion surrounds the particulate separator.

13. The product as recited in claim 9, wherein the particulate separator is coupled to the housing by at least one of a friction fit, an insert molding and a fastener.

14. The product as recited in claim 9 wherein the particulate separator has end portions each over molded with an elastic ridge, and wherein the end portions are snap fit within an annular channel in the housing.

15. The product as recited in claim 14, wherein the elastic ridge snap fit within the annular channel of the housing creates a seal so that the exhaust gases are directed through the particulate separator.

16. A product integrating multiple engine breathing system components comprising:
an intake conduit configured to route intake air toward an internal combustion engine;
an exhaust conduit configured to receive exhaust gases from the internal combustion engine;
a turbocharger having a turbine portion associated with the exhaust conduit and a compressor portion associated with the intake conduit so that the compressor portion compresses the intake air in the intake conduit in response to the exhaust gases rotating the turbine portion in the exhaust conduit;
a recirculation conduit in communication between the exhaust conduit and the intake conduit to recirculate at least a portion of the exhaust gases through the intake conduit to the internal combustion engine;
the product connecting the recirculation conduit to the intake conduit, the product having a housing and a particulate separator, the housing having an integrated mixer portion and first, second and third openings, the first opening being configured to receive the exhaust gases from the recirculation conduit, the second opening being configured to receive the intake air from one portion of the intake conduit, the mixer portion in communication with the first and second openings to mix the exhaust gases and the intake air into a gas mixture, and the third opening in communication with the mixer portion to flow the gas mixture therethrough into another portion of the intake conduit; and
first and second conduits with the mixer portion being an integral part of the second conduit, the first conduit having an exhaust gas passage in communication with the first opening to receive the exhaust gases, the first conduit substantially surrounding the mixer portion, the mixer portion having a plurality of spaced apart openings in communication with the exhaust gas passage to receive the exhaust gases, the second conduit having a mixing passage that is in communication with the spaced apart openings to receive the exhaust gases, and the particulate separator being disposed within the mixing passage of the second conduit configured to remove particulates from the exhaust gases.

* * * * *